United States Patent
Uemura et al.

(10) Patent No.: US 6,343,334 B1
(45) Date of Patent: Jan. 29, 2002

(54) DETECTOR OF AN OSCILLATION STOPPING AND AN APPARATUS FOR EXECUTING A TREATMENT AFTER THE DETECTION OF AN OSCILLATION STOPPING

(75) Inventors: Toshiyuki Uemura; Yoshiki Cho, both of Hyoho (JP)

(73) Assignees: Mitsubishi Electric System LSI Design Corporation, Itami; Mitsubishi Denki Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/265,384

(22) Filed: Mar. 10, 1999

(30) Foreign Application Priority Data

Oct. 20, 1998 (JP) ............................................ 10-298607

(51) Int. Cl.[7] ........................... G06F 13/14; G06F 13/20
(52) U.S. Cl. ................................ 710/8; 710/5; 710/10; 713/300; 713/500; 713/600; 713/601
(58) Field of Search ................................ 713/600, 300, 713/500, 601; 710/5, 8, 10

(56) References Cited

U.S. PATENT DOCUMENTS

| | | | | |
|---|---|---|---|---|
| 4,716,521 A | * | 12/1987 | Nagae .......................... | 364/200 |
| 5,440,603 A | * | 8/1995 | Sugita .......................... | 377/20 |
| 5,619,643 A | | 4/1997 | Moroni et al. | |
| 5,870,441 A | * | 2/1999 | Cotton et al. ................ | 375/354 |
| 5,936,452 A | * | 8/1999 | Utsuno et al. ............... | 327/292 |
| 6,011,447 A | * | 1/2000 | Iwasaki ....................... | 331/185 |

FOREIGN PATENT DOCUMENTS

| | | |
|---|---|---|
| EP | 0 385 404 A2 | 9/1990 |
| JP | 9-73404 | 3/1997 |

* cited by examiner

*Primary Examiner*—Thomas Lee
*Assistant Examiner*—Rehana Perveen
(74) *Attorney, Agent, or Firm*—Burns, Doane, Swecker & Mathis, LLP (57) ABSTRACT

A detector of an oscillation stopping, which detects the stopping of the oscillation of external clock 11, without increasing the load of CPU 45 in the micro computer 40, and generates a signal to reset the micro computer or exchanges the system clock from the external clock to an inner clock.

In an embodiment, one shot pulse is generated for every standing up and/or down edge of the external clock. A capacitor of the charge-discharge circuit is charged and discharged at every one shot pulse. The voltage of the charge-discharge circuit is watched by a Schmitt circuit. When the voltage of the charge-discharge circuit exceeds a predetermined voltage, a signal for resetting the micro computer is generated.

In another embodiment, an inner clock oscillation circuit, comprised of a ring oscillator, for example, is actuated, when the voltage of the charge/discharge circuit exceeds a predetermined voltage, and the system clock of the micro computer is exchanged to the inner clock from the external clock.

In another embodiment, an interruption signal is sent to the CPU of the micro computer to execute an appropriate treatment after the stopping of the clock oscillation, when the voltage of the charge/discharge circuit exceeds a predetermined voltage.

In another embodiment, a watchdog timer monitors the malfunction of the micro computer. It is judged whether the accident is a stopping of the oscillation of the clock or a malfunction of the micro computer. The treatment after the stopping of the clock is executed, according to the reason of the accident.

6 Claims, 5 Drawing Sheets

DETECTOR OF AN OSCILLATION STOPPING AND AN APPARATUS FOR EXECUTING A TREATMENT AFTER THE DETECTION OF AN OSCILLATION STOPPING

BACKGROUND OF THE INVENTION

1. Field of the Invention

The present invention relates to a detector of an oscillation stopping for detecting an oscillation stopping of an external oscillator, which provides an external clock to a micro computer, and for generating a signal to reset the micro computer or for generating a signal to execute an interruption command, when such an oscillation stopping is detected. The present invention relates also to an apparatus for executing a treatment after the detection of an oscillation stopping.

2. Description of the Prior Art

Figure 6:
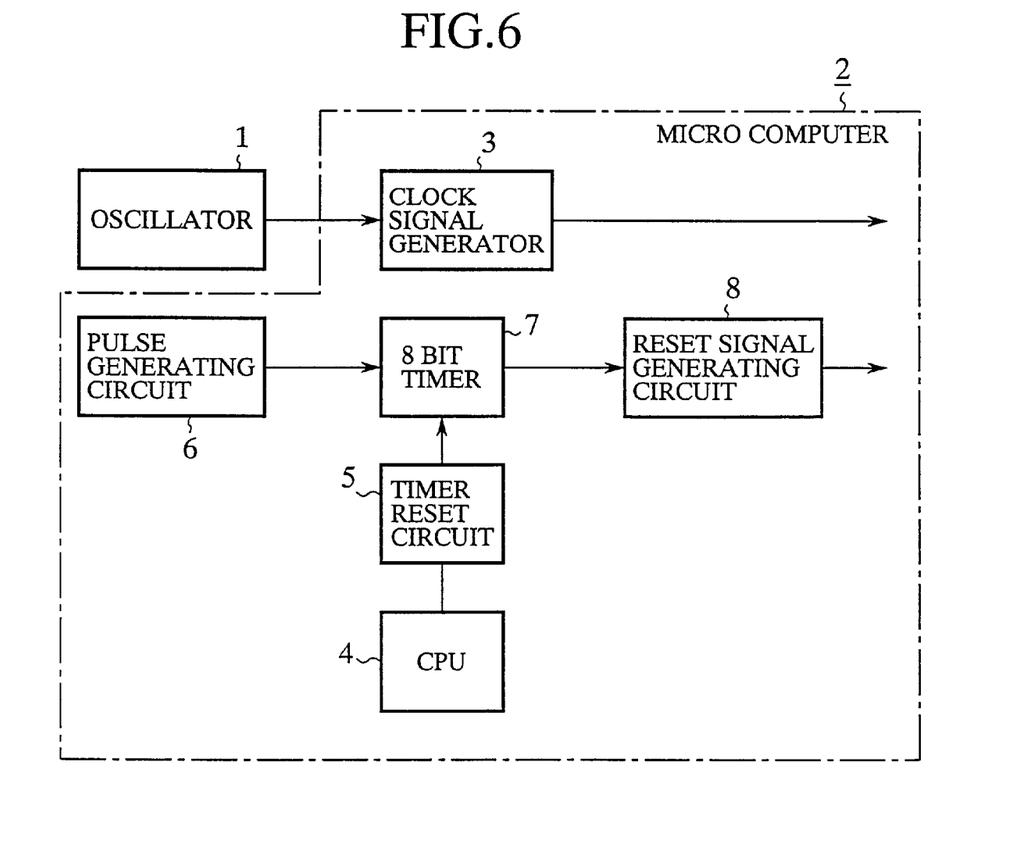
FIG. 6 shows a block diagram of a detector of an oscillation stopping in the prior art.

FIG. 6 shows a block diagram of a detector of an oscillation stopping in the prior art. Reference numeral 1 denotes a oscillator, 2 is a micro computer formed on a semiconductor substrate (or a semiconductor chip). The micro computer 2 comprises the following elements 3–8, which are provided on a semiconductor substrate. A clock signal generator 3 generates a clock signal, and is connected to the oscillator 1. A CPU 4, which functions according to the clock signal, generates a reset command periodically. A timer reset circuit 5 generates a reset pulse in response to the reset command. A pulse generating circuit 6 generates a pulse signal at a constant period. An eight bit timer 7 increments its count value in response to the pulse signal from the pulse generating circuit 6 and resets the count value in response to the reset pulse from the timer reset circuit 5. The eight bit timer outputs an over flow signal, when the count value reaches to a predetermined value. A reset signal generating circuit 8 generates a reset signal for resetting the micro computer 2, in response to the over flow signal from the eight bit timer 7.

Figure 3:
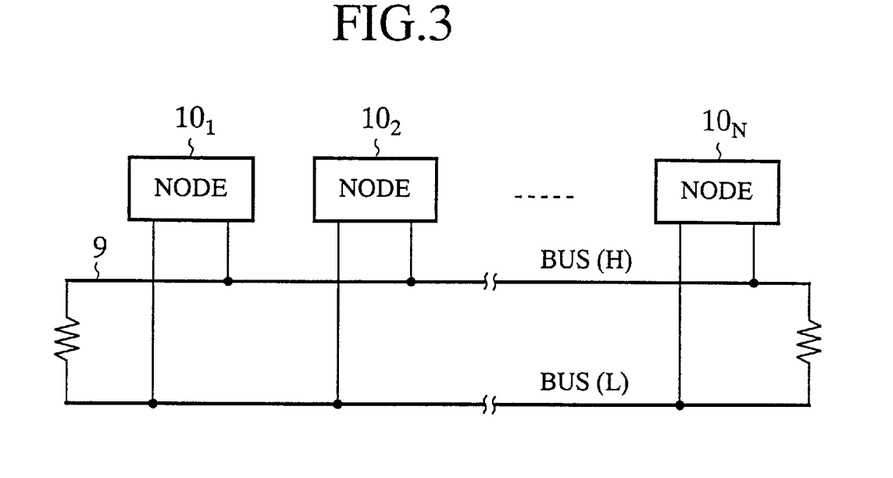
FIG. 3 shows a schematic diagram of a LAN system, in which a plurality of micro computers are connected.

FIG. 3 shows a block diagram of a LAN system comprised of a plurality of micro computers. Reference numeral 9 is a serial bus, and a plurality of micro computers are connected to nodes $10_1$–$10_N$ on the serial bus 9.

The system functions as follows. When the micro computers have a communication function, they can transfer data to each other through the serial bus 9. However, when an accident occurs, for example, the oscillator of a micro computer is disconnected, while the micro computer is transferring data, then the micro computer stops and continues to output a dominant level signal (for example "H" level signal) or a recessive level signal (for example "L" level signal) to the serial bus 9.

When the micro computer stops and continues to output the "L" level signal onto the bus, the influence to the other micro computers are rather small, and they can communicate to each other through the serial bus 9. On the other hand, when the micro computer stops and continues to output the "H" level signal, the other micro computers cannot communicates to each other. Because even if one of the other computers outputs an "L" level signal onto the serial bus 9, the signal level in the serial bus 9 does not change to the "L" level. As a result, the communication is no longer possible.

When such an accident occurs, a reset of the micro computer is necessary, so as to cancel the state, in which the "H" level signal is outputted continuously to the serial bus 9. After such an accident, the detector of an oscillation stopping in the prior art resets the microcomputer as follows.

In a normal state, namely no accident occurred, for example, no oscillator is disconnected, the CPU 4 functions in synchronization with the clock signal from the clock signal generating circuit 3. And the CPU generates a reset command signal periodically. The timer reset circuit 5 generates a reset pulse in response to the reset command. The count value of the eight bit timer 7 is reset by this reset pulse periodically. Thus, no over flow signal is outputted from the eight bit timer 7. As a result, the reset signal generating circuit 8 outputs no signal to reset the micro computer 2.

On the other hand, when an accident occurs, for example, the oscillator 1 is disconnected, no clock signal is supplied to the CPU 4 from the clock generating circuit 3, and the CPU 4 stops its function. Thus the CPU 4 does not generate the reset command. As result, the timer reset circuit 5 cannot generate the reset pulse to reset the eight bit timer 7. Consequently, the eight bit timer 7 increases its count value according to the pulse from the pulse generating circuit 6, until it overflows to output an over flow signal to the reset signal generating circuit 8. When the reset signal generating circuit 8 receives the over flow signal from the eight bit timer 7, it generates a reset signal to reset the micro computer 2. Once the micro computer 2 is reset, the state outputting the "H" level signal to the serial bus 9 is cancelled.

The detector of an oscillation stopping in the prior art, constructed as aforementioned, can reset the micro computer 2, when the micro computer 4 stops its function after the accident, for example, the disconnection of the oscillator 1. However, while the CPU 4 functions normally the CPU 4 must always output the reset command periodically. Thus, the load of the CPU 4 is large.

Moreover, if the oscillator 1 stops, while the CPU 4 is outputting a reset command, the CPU 4 continues to output the reset command. Thus, the count value of the eight bit timer 7 does not overflow after the stopping of the oscillator 1. As a result, the reset signal generating circuit 8 cannot generates the reset signal.

Further, the stopping of the oscillation 1 is detected by the over flow signal of the eight bit timer, however, it takes a long time until the eight bit timer overflows. As a result, it takes a long time until the stopping of the oscillation can be detected, and treatments of the micro computer 2 cannot be started promptly after the stopping of the oscillator 1.

SUMMARY OF THE INVENTION

An object of the present invention is to propose a detector of an oscillation stopping, which can eliminate the aforementioned drawbacks.

Another object is to propose a detector of an oscillation stopping, which detects quickly the oscillation stopping of an external oscillator, without increasing the work of the CPU. Such detector shall generate a reset signal of the micro computer or an interruption signal to the CPU, in order to treat the CPU or the micro computer promptly after the stopping of the oscillation.

The detector of an oscillation stopping, according to the present invention, comprises a one shot pulse generating circuit, which generates a one shot pulse, when it detects an external clock signal, a charge/discharge circuit, which charges, while the one shot pulse is not generated, and discharges, while the one shot pulse is generated, and an interruption signal generating circuit, which generates an interruption signal for initializing the micro computer, when the charged voltage of the charge/discharge circuit exceeds a predetermined value.

An apparatus for executing a treatment after the detection of an oscillation stopping, as an embodiment of the present invention, comprises a one shot pulse generating circuit, which generates a one shot pulse, when it detects an external clock signal, a charge/discharge circuit, which charges, while the one shot pulse is not generated, and discharges, while the one shot pulse is generated, an oscillation stopping signal generating circuit, which generates an oscillation stopping signal, when the charged voltage of the charge/discharge circuit exceeds a predetermined value, an internal clock generating circuit, which is formed as a ring oscillator or as a CR oscillator and is actuated by the signal indicating that the oscillation is stopping, for supplying an internal clock signal to the micro computer, and an interruption signal generating circuit for generating and supplying an interruption signal to the CPU in response to the oscillation stopping signal.

A detector of an oscillation stopping or an apparatus for executing a treatment after the detection of an oscillation stopping, as an embodiment of the present invention, comprise a logic circuit, which prohibits the function of the charge-discharge circuit, either when the CPU outputs a signal to prohibit the charge/discharge function of the charge/discharge circuit, or when the CPU outputs a signal to enter into a stop/wait mode.

An apparatus for executing a treatment after the detection of an oscillation stopping, as an embodiment of the present invention, comprises a flip-flop circuit for supplying a signal indicating that the oscillation is stopping to the micro computer, in synchronization with the system signal.

An apparatus for executing a treatment after the detection of an oscillation stopping, as an embodiment of the present invention, comprises a register for storing a data provided from the CPU concerning the starting or stopping of the inner clock signal generating circuit, and a clock exchanging circuit for providing a clock signal to the micro computer, which selects the inner clock as the system clock signal, when the data stored in the register is the data for starting the inner clock signal generating circuit, and selects an external clock as the system clock signal, when the stored data in the register is the data for stopping the inner clock signal generating circuit.

DETAILED DESCRIPTION OF THE PREFERRED EMBODIMENTS

EMBODIMENT 1

Figure 1:
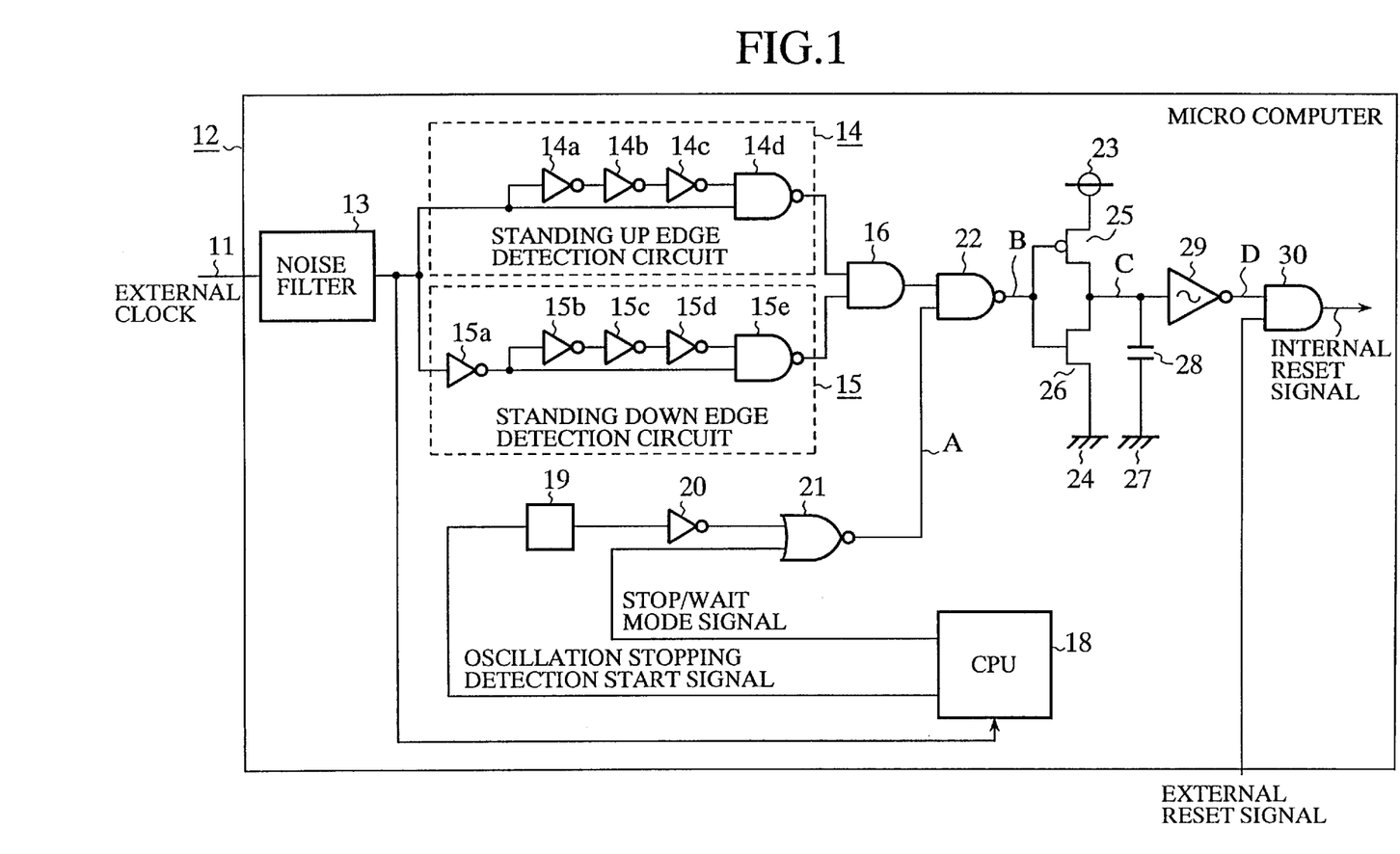
FIG. 1 shows a block diagram of a detector of an oscillation stopping according to the first embodiment of the present invention.

FIG. 1 shows a block diagram of a detector of an oscillation stopping according to the first embodiment of the present invention. Reference numeral 11 denotes a clock signal supplied from an external oscillator through an external clock input terminal. Reference numeral 12 denotes a micro computer formed on a semiconductor substrate. A noise filter 13 eliminates noises in the external clock signal. A standing up edge detection circuit 14 for detecting the standing up edge of the external clock signal 11 is a one shot pulse generating circuit comprised of inverters 14a–14c and a NAND circuit 14d. A standing down edge detection circuit 15 for detecting the standing down edge of the external clock signal is a one shot pulse generating circuit comprised of inverters 15a–15d and a NAND circuit 15e. An AND circuit 16 calculates the AND logic of the outputs of the standing up edge detection circuit 14 and the standing down edge detection circuit 15 to output a one shot pulse at the moment when the standing up edge or the standing down edge of the external clock signal is detected.

A CPU 18, which functions in synchronization with the noise eliminated external clock signal, outputs a detection starting signal and a stop/wait mode signal for setting a stop/wait mode. The detection starting signal determines whether the detection of oscillation stopping is carried out or not by its value "H" or "L". In the stop/wait mode, the use of the external clock signal is stopped or is set to be waited, directly by the CPU 18. A register 19 stores the detection starting signal. Reference numeral 20 denotes an inverter. A NAND circuit 21 calculates the NAND logic of the output signal of the inverter 20 and the detection starting signal.

A charge/discharge circuit is formed by a power supply 23, a ground 24, a P channel transistor 25, a N channel transistor 26, a ground 27 and a capacitor 28. A Schmitt circuit 29 outputs a signal indicating that the oscillation stopping of the external clock signal occurred, when the voltage of the charged capacitor 28 reaches to a predetermined voltage. The Schmitt circuit functions as an initializing signal generating circuit. An AND circuit 30 calculates an AND logic of the output of the Schmitt circuit 30 and an external reset signal. The AND circuit 30 outputs an internal reset signal for resetting the micro computer 12, when predetermined conditions are satisfied. The output of the AND circuit 30 initializes the micro computer. The external reset signal is provided from outside of the semiconductor chip.

Figure 2:
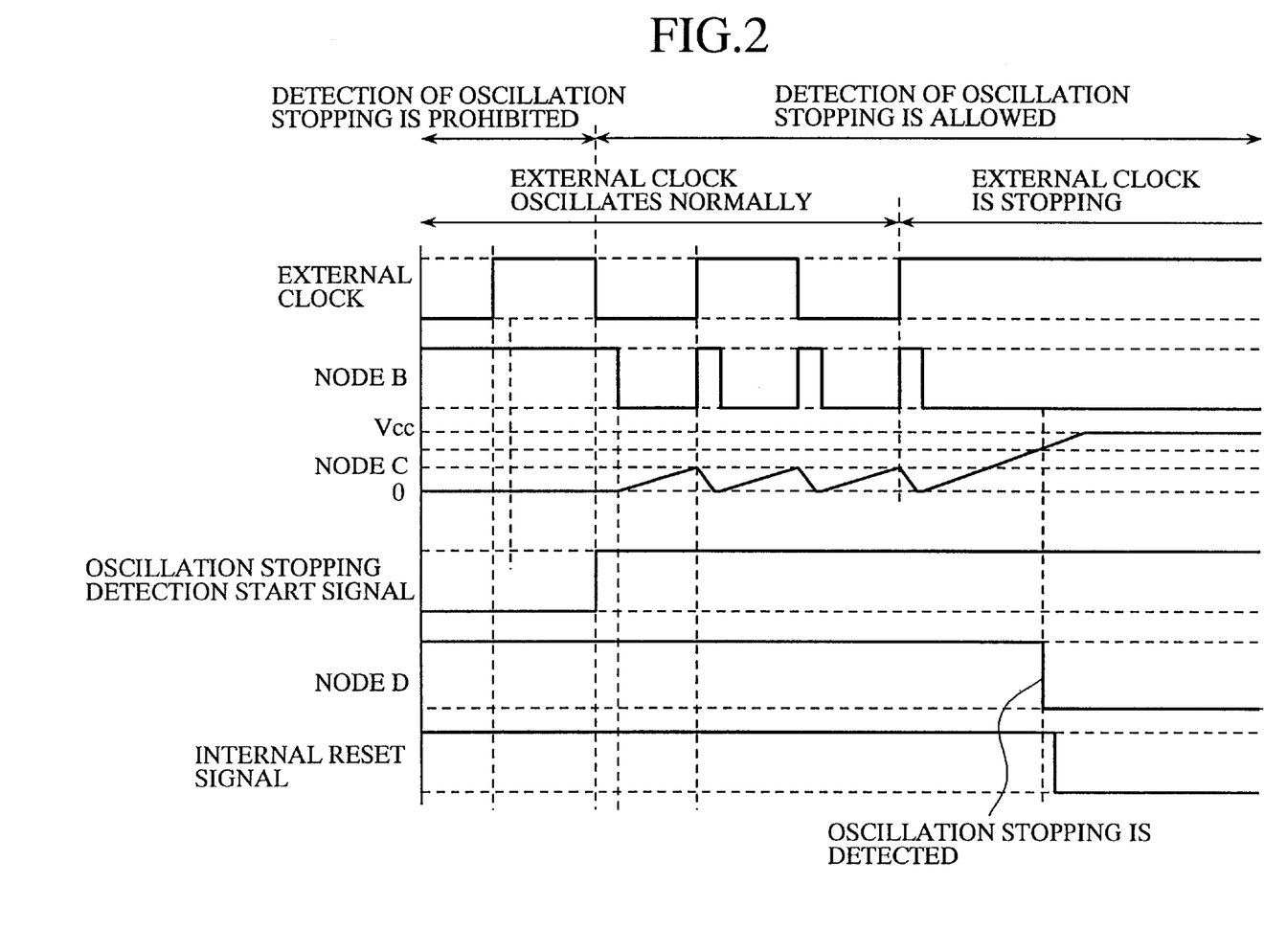
FIG. 2 shows a time chart of signals in a detector of an oscillation stopping according to the first embodiment of the present invention.

FIG. 2 shows a time chart of signals in the detector of an oscillation stopping according to the first embodiment of the present invention. The function of the detector system is explained below, referring to FIGS. 1 and 2.

Case 1: The detection starting signal from the CPU 18 is "H", namely the detection of the oscillation stopping is allowed, and the stop/wait mode signal from the CPU 18 is "L" so as not to select the stop/wait mode. In this state, the node A in FIG. 1 is "H".

When the external clock signal 11 oscillates normally, while the detection starting signal is in a state to allow the detection of the oscillation stopping, as shown at the central portion of FIG. 2, the standing up edge and the standing down edge of the external clock signal are detected by the detectors 14 and 15, respectively. The AND logic of the outputs of the detectors 14 and 15 is calculated by the AND circuit 16, and the NAND logic of the output of the AND circuit 16 and the "H" of the node A is calculated by the NAND circuit 22. One shot pulses of "H" appear corresponding to the standing up edges and the standing down edges of the external clock signal 11 at a node B, which is the output of the NAND circuit 22.

The P channel transistor 25 turns on, when the node B is "L". On the other hand, the N channel transistor 26 turns on, when the node B is "H". Thus, while the one shot pulse at the node B is "L", the P channel transistor 25 turns on, and the power supply 23 charges the capacitor 28. On the other hand, while the one shot pulse at the node B is "H", the N channel transistor 26 turns on to discharge the capacitor 28 to the ground 27. As a result, a sawtooth waveform signal appears at the node C, which is the connecting point of the P channel transistor 25 and the N channel transistor 26. The voltage at the node C is compared with a predetermined value by the Schmitt circuit 29. When the external clock signal 11 oscillates normally, the charge of the capacitor 28 is discharged periodically at every standing up edge and the standing down edge of the external clock signal. Thus, the voltage at the node C is decreased periodically and cannot exceed the threshold value of the Schmitt circuit 29.

In such a state, the Schmitt circuit 29 outputs a signal of "H", which indicates that the external clock signal 11 oscillates normally. Namely the voltage of the node D, which is the output of the Schmitt circuit 29, is "H". Under a condition that no external reset signal of "L" is supplied, the AND circuit 30 outputs an output of "H" to invalidate the reset of the micro computer 12, so that the reset of the micro 12 does not take place.

On the other hand, when the oscillation of the external clock 11 stops, while the detection starting signal is in a state to allow the detection of the oscillation stopping, as shown at the right portion of FIG. 2, no one shot pulse appears at the node B, and the state of "L" continues at the node B. Therefore, the P channel transistor 25 continues the turn on state, and the N channel transistor 26 is not turned on. Thus, the capacitor 28 continues to be charged until the voltage at the node C exceeds a predetermined threshold voltage of the Schmitt circuit 29. The Schmitt circuit 29 outputs a signal of "L", indicating that the oscillation of the external clock 11 is stopping. Namely, the voltage at the node D becomes "L" level. As a result, the AND circuit 30 outputs an internal reset signal of "L" to reset the micro computer 12, even if the external reset signal of "L" is not supplied. For example, all the input-output ports of the semiconductor ship are set to be the input port state by this inner reset signal, so as to prevent the influence of the oscillation stopping to the other micro computers.

Case 2: The detection starting signal is "L" (the detection of the oscillation stopping is prohibited), and/or the stop/wait signal is "H" (the stop/wait mode is selected). The system functions as follows. In this state, the node A is "H", therefore the node B is always "L". This state is shown at the left portion of FIG. 2.

Because the node B is always "H", the N channel transistor 26 turns on continuously, and the P channel transistor 25 turns off continuously, therefore the voltage of the node C can not exceed the predetermined threshold voltage of the Schmitt circuit 29. As a result, the Schmitt circuit 29 outputs a signal of "H", and the node D becomes "H". The AND circuit 30 outputs a signal of "H", which invalidates the reset of the micro computer 12, under a condition that no external reset signal is supplied. Thus the reset of the micro computer 12 does not take place.

FIG. 3 shows a schematic diagram of a LAN system, in which a plurality of micro computers are connected. In the figure, 9 denotes a serial bus, and 10$_1$–10$_N$ are a plurality of nodes of the LAN. A micro computer is connected to each node.

In such a LAN system, to which a plurality of micro computers 12 are connected to a common serial data bus 9, when one of the micro computers 12 stops, for example, due to an extraordinary stop of the external clock 11, and if the computer continues to output a signal of "H" onto the serial bus, the state of the bus cannot be changed to "L", even if one of the other micro computer outputs a signal of "L" onto the bus for utilizing the bus. Thus the communication between the other micro computers becomes impossible after the stopping of the external clock 11.

However, when the detector of an oscillation stopping according to the first embodiment of the present invention is used, the micro computer 12 is reset after such an accident, and, for example, all the input-output ports of the semiconductor chip are set to be the input port. As a result, the state to output a signal of "H" continuously onto the bus 9 is cancelled so as to prevent the influence of the accident to the other micro computers. The communication between the other micro computers through the bus can be maintained after such an accident of the oscillation stopping of the external clock 11.

The function of the first embodiment is explained, referring a LAN system, to which a plurality of micro computers are connected. However this is no more than an example. Of course, the a detector of an oscillation stopping according to the first embodiment can be used in any system which includes micro computers as its elements.

As mentioned above, when the detector of an oscillation stopping according to the first embodiment is used, the CPU 18 plays no roll to detect the oscillation stopping, thus the load of the CPU can be reduced, and the detection of the oscillation stopping can be assured.

The oscillation stopping can be detected, on the basis of the time interval of the external clock 11, therefore the time from the occurrence of the oscillation stopping to its detection is short. Namely the oscillation stopping can be quickly detected, and a quick response to the micro computer 12 after the detection of the oscillation stopping is possible.

Using the detection starting signal or a stop/wait mode signal from the CPU 18, it is possible to allow or prohibit the detection of oscillation stopping. Thus, according to the application of the micro computer 12, the detection of oscillation stopping can be allowed or prohibited so as to increase the reliability of the micro computer 12 or to reduce the consumption of the electric power by prohibiting the detection of the oscillation stopping.

EMBODIMENT 2

Figure 4:
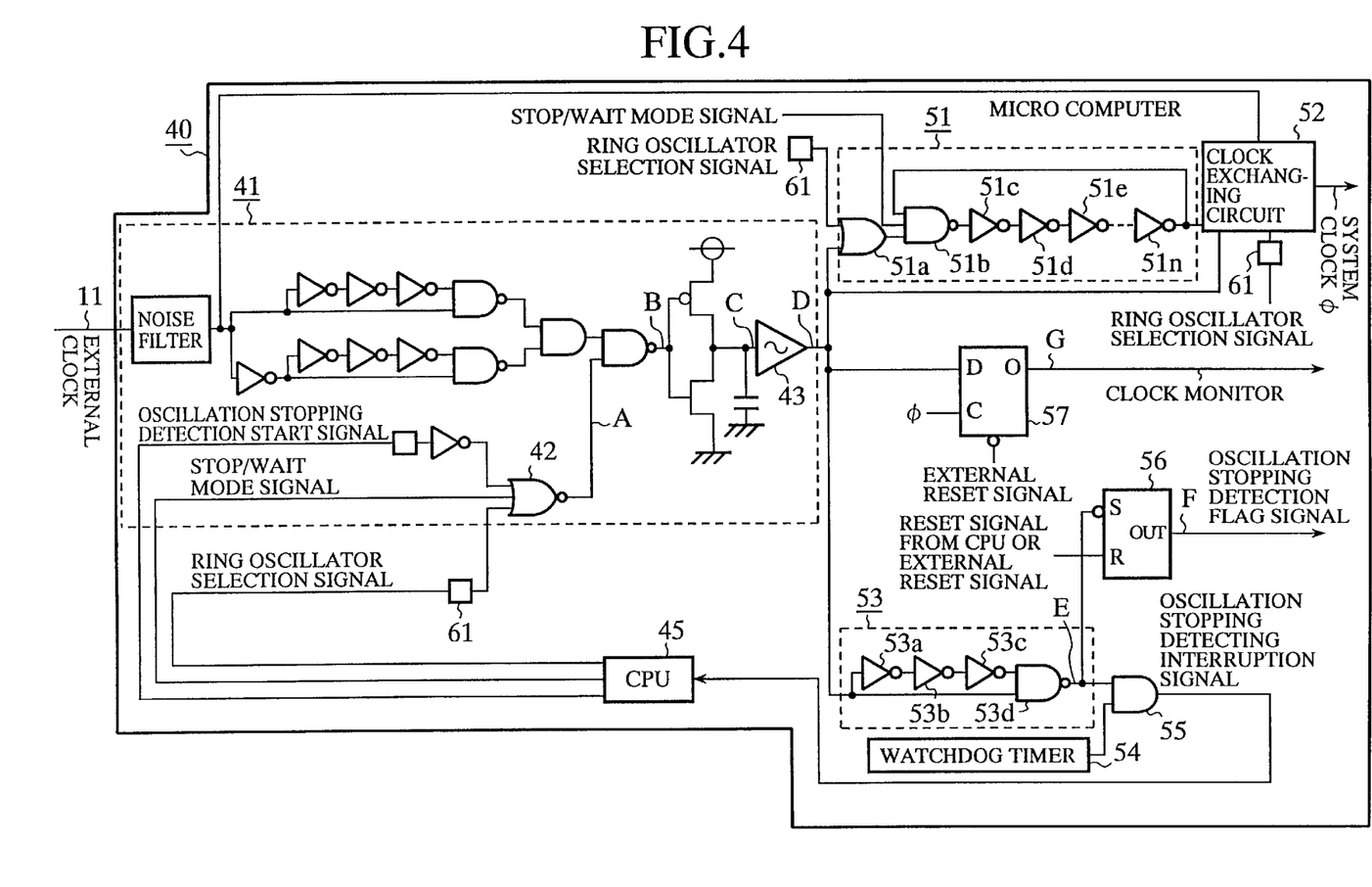
FIG. 4 shows an apparatus for executing a treatment after the detection of an oscillation stopping according to the second embodiment of the present invention.

FIG. 4 shows a schematic diagram of an apparatus for executing a treatment after the detection of the oscillation stopping according to the second embodiment of the present invention.

Reference numeral 40 denotes a micro computer formed on a semiconductor substrate. The framed portion 41 is substantially identical with the detector of an oscillation stopping according to the first embodiment of the present invention.

However the framed portion comprises a NOR circuit 42 with three input terminals, and a Schmitt circuit 43 (oscillation stopping signal generating circuit), which outputs a signal of "H", when the oscillation of the external clock stops. The AND circuit 30 in FIG. 1 is not included in the framed portion. CPU 45 is not identical with the CPU 18 in the first embodiment, its functions is different from the latter, and will be explained later.

A framed portion 51 is a ring oscillator, which is actuated by the oscillation stopping signal from the Schmitt circuit 43, and generates an inner clock signal, namely it is an internal clock oscillator. The ring oscillator 51 comprises an OR circuit 51a, a NAND circuit 51b, which calculates the NAND logic of the output of the Schmitt circuit 43, the inverse of the stop/wait mode signal and a feed back signal of the ring oscillator, and inverters 51c–51n.

A clock exchanging circuit 52 selects either of the external clock 11 or the internal clock generated by the ring oscillator 51, in accordance with the oscillation stopping signal from the Schmitt circuit 43, and provides the selected clock signal, as a system clock signal φ, to the micro computer 40.

A standing up edge detection circuit 53 detects the standing up edge of the oscillation stopping signal from the Schmitt circuit 43 to generate a one shot pulse, and supplies it to the CPU 45 through an AND circuit 55. The one shot pulse functions as an interruption signal to the CPU 45. The standing up edge detection circuit 53 comprises inverters 53a–53c and a NAND circuit 53d. Reference numeral 54 denotes a watchdog timer, which detects the malfunction of the micro computer 40. An AND circuit 53 calculates the AND logic of the outputs of the standing up edge detection circuit 53 and the watchdog timer 54.

An SR (set/reset) latch circuit 56 is reset by a reset signal from the CPU 45 or by an external reset signal. The SR latch circuit 56 is set by the one shot pulse from the standing up edge detection circuit 53 to generate an oscillation stopping detection flag signal to the micro computer 40.

A flip-flop circuit 57 generates a clock monitor signal to the micro computer 40, by synchronizing the oscillation stopping signal from the Schmitt circuit 43 with the system clock φ. The micro computer 40 monitors the state of clock φ, according to the clock monitor signal from the flip-flop circuit 57. The flip-flop circuit 57 is reset by an external reset signal.

Figure 5:
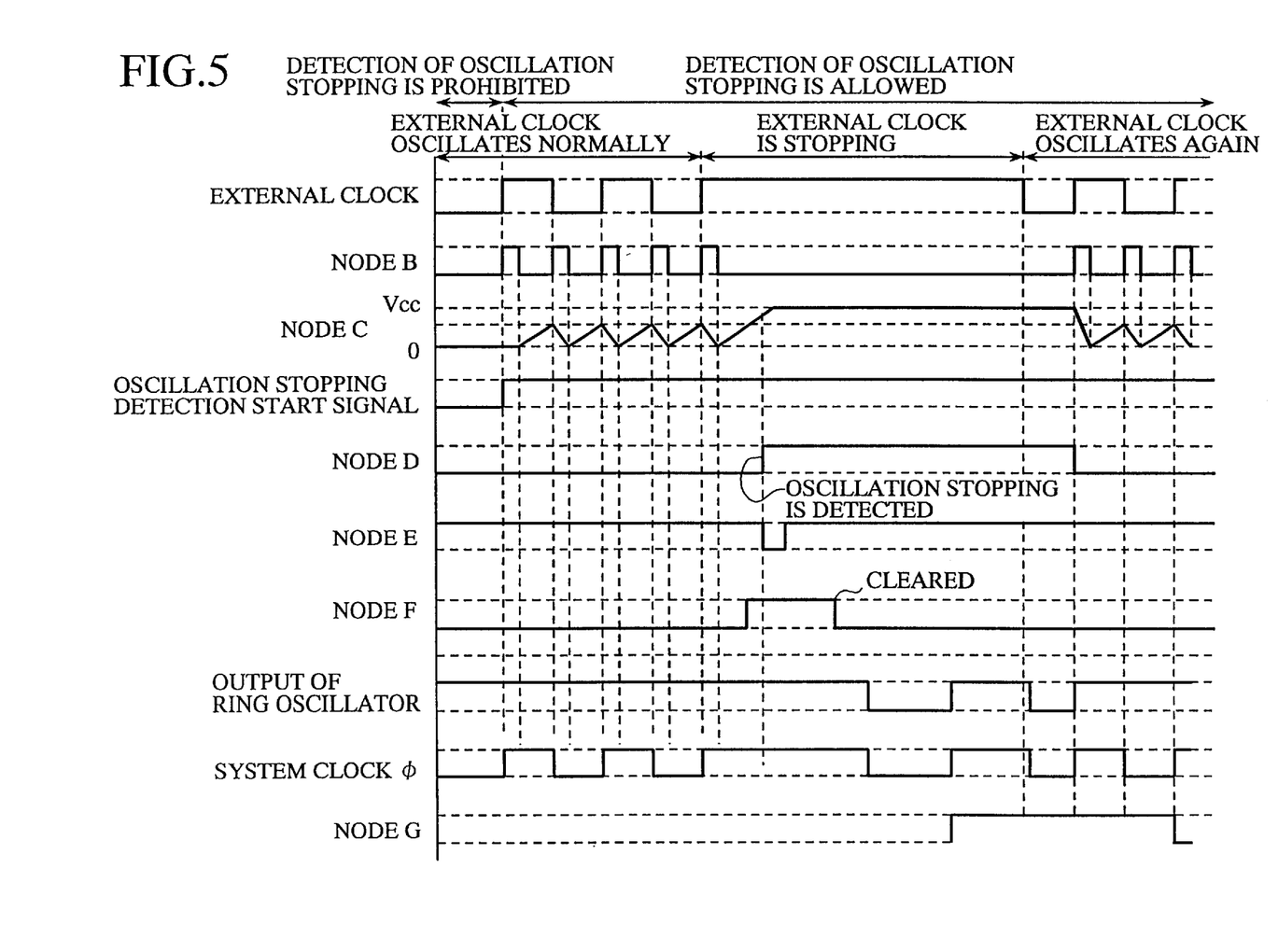
FIG. 5 shows a time chart of signals in an apparatus for executing a treatment after the detection of an oscillation stopping according to the second embodiment of the present invention.

FIG. 5 shows a time chart of signals in the apparatus for executing a treatment after the detection of the oscillation stopping, according to the second embodiment.

The function of the apparatus for executing a treatment after the detection of the oscillation stopping is explained below, referring to FIGS. 4 and 5.

Case 1: The detection starting signal is "H" (the detection of the oscillation stopping is allowed), and the stop/wait signal is "L" (the stop/wait mode is not selected). In this state, the node A is "H".

When the external clock 11 oscillates normally, while the detection of the oscillation stopping is allowed, as shown in FIG. 5, one shot pulse of "H" level appears at the node B for each standing up edge and for each standing down edge of the external clock 11. The voltage at the node C is a sawtooth wave form. Therefore the voltage at the node C does not exceed a predetermined threshold voltage of the Schmitt circuit 43, and the Schmitt circuit 43 outputs a signal of "L" to the node D, which implies that the oscillation of the external clock 11 is normal.

As a result, the ring oscillator 51 is not actuated, and the clock exchanging circuit 52 continues to supply the external clock 11, as a system clock φ, to the micro computer 40. The standing up edge detection circuit 53 does not generate the one shot pulse as an interruption signal. A flip-flop circuit 57 generates a clock monitor signal, by synchronizing the "L" output of the Schmitt circuit 57 with the system clock φ. The output of the flip-flop circuit 57 is sent to the micro computer 40 to inform that the present system clock φ is the external clock 11.

When the oscillation of the external clock 11 stops, while the detection of the oscillation stopping is allowed, as shown in FIG. 5, one shot pulses do not appear at the node B. The level of the node B is "L" continuously. Therefore the voltage of node C increases to exceed the predetermined threshold voltage of the Schmitt circuit 43. The Schmitt circuit 43 outputs a signal of "H" to the node D, which implies that the oscillation of the external clock 11 is stopping.

The input of the OR circuit 51a is an oscillation stopping signal of "H". Hence the output of the OR circuit 51a, which is an input of the NAND circuit 51b, is "H". And a stop/wait signal of "H" is inputted to another input terminal of the NAND circuit 51b, thus, the ring oscillator 51 is actuated to oscillate and generates an inner clock signal. Because an oscillation stopping signal of "H" is sent to the clock exchanging circuit 52 from the Schmitt circuit 43, the clock exchanging circuit 52 exchanges the system clock φ from the external clock 11 to the inner clock and supplies it to the micro computer 40.

The standing up edge detection circuit 53 generates a one shot pulse of "L", as an interruption signal, at the node E. The signal is sent to the CPU 45 through the AND circuit 55.

The SR latch circuit 56 maintains the oscillation stopping flag signal to be "H", according to the one shot pulse of "L" from the standing up edge detecting circuit 53, and sends it the micro computer 40.

One might think that the interruption signal of the oscillation stopping flag signal sent through the AND circuit 55 and the oscillation stopping detection flag signal from the SR latch circuit 56 are redundant, however, there is a difference between them. The AND circuit 55 calculates the AND of the oscillation stopping detection interruption signal and the malfunctions detection signal, which is an output of the watchdog timer 54. After receiving the oscillation stopping signal, the CPU 45 can discriminate whether the oscillation stopping signal is caused by a malfunction of the micro computer 40 or by a stopping of the external clock 11, referring to both the signals.

When the micro computer 40 judges that the oscillation of the external clock 11 is stopping, on the basis of the oscillation stopping detection interruption signal and the oscillation stopping detection flag signal, it executes a predetermined interruption command, according to the application program of the micro computer. Simultaneously, the SR latch 56 is reset by the micro computer 40, and the oscillation stopping flag signal returns to "L". The predetermined interruption command includes, for example, reporting of warning, setting all the input/output ports to be input ports, and setting the external clock inputting terminal to a fixed value.

The flip-flop circuit 57 provides the oscillation stopping signal of "H" to the micro computer 40, which is synchronized with the system clock φ. Now the system clock is the inner clock generated in the ring oscillator 51. The micro computer 40 is informed by this signal that the present clock is the inner clock.

After an oscillation stopping period, in which the oscillation of the external clock stops and the system clock is exchanged to the inner clock, as shown in FIG. 5, if the external clock 11 begins to oscillate again, while the detection of oscillation stopping is allowed, one shot pulse of "H" appears at every standing up and standing down edge of the external clock 11 at the node B. The voltage of the node C is sawtooth wave form and does not exceed the predetermined threshold voltage of the Schmitt circuit 43. Therefore the Schmitt circuit 43 outputs a signal of "L" to the node D, which implies that the oscillation of the external clock 11 is normal.

As a result, a signal of "L" is input to an input terminal of the OR circuit 51a. A ring oscillator selection signal 61 is set always "L" in the second embodiment. Thus output of the OR circuit 51a is "L", which is supplied to the NAND circuit 51b. The oscillation of the ring oscillator 51 stops. An oscillation stopping signal of "L" is input to the clock exchanging circuit 52, therefore the clock exchanging circuit 52 exchanges the system clock φ from the inner clock to the external clock 11 to supply to the micro computer 40.

The standing up edge detection circuit 53 generates no one shot pulse, as an oscillation stopping detection interruption signal. The flip-flop circuit 57 sends a clock monitor signal of "L", which is synchronized with the system clock φ, to the micro computer 40 to inform that the present system clock φ is the external clock.

The micro computer 40 judges, on the basis of the clock monitor signal, that the system clock φ is exchanged from the inner clock generated by the ring oscillator 51 to the external oscillator 11. The micro computer ends the interruption command routine and returns to the ordinal routine.

Case 2: The detection starting signal from the CPU 45 is "L" (the detection of the oscillation stopping is prohibited), or the stop/wait signal is "H" (the stop/wait mode is selected): In this state, the node A is "L", therefore, the node B is always "H".

Because the node B is always "H", the voltage at the node C cannot exceed the predetermined threshold voltage of the Schmitt circuit 43, therefore the Schmitt circuit 43 outputs "L" to the node D, as shown in FIG. 5. As a result, the ring oscillator 51 is not actuated to oscillate. The clock exchanging circuit 52 continues to provide the external clock φ, as a system clock, to the micro computer 40. The standing up edge detection circuit 53 does not generate the one shot pulse. Namely no oscillation stopping detection signal, as an interruption signal, is supplied to the micro computer 40.

The flip-flop circuit 57 outputs a clock monitor signal of "L", synchronized with the system clock φ, to the micro computer 40 to inform that the present system clock φ is the external clock 11.

A ring oscillator 51 is used for generating an inner clock signal in the second embodiment. However, another type oscillator, for example, a CR oscillator may be used for generating the inner clock signal.

There are following advantages in the apparatus for executing a treatment after the detection of an oscillation stopping according to the second embodiment of the present invention:

According to the second embodiment, during the oscillation stopping period of the external clock 11, the clock exchanging circuit 52 exchanges the system clock from the external clock to an internal clock generated by a ring oscillator 51 or a CR oscillator, for example. Thus the micro computer 40 can continue its function, while the external clock 11 is stopping.

When the oscillation of the external clock 11 stops, the standing up edge detection circuit 53 and the AND circuit 55 generate a one shot pulse, as an interruption command. Thus corresponding interruption routines can be executed, according to a many kind of application programs of the micro computer.

Referring to the oscillation stopping detection flag signal from the SR latch circuit 56, the reason of the accident can be exactly identified as to whether the accident is a malfunction of the micro computer 40, which can be detected by the watchdog timer 54, or the accident is a stopping of the external oscillation. It can be identified that, for example, the accident is not such a malfunction, but a stopping of the oscillation of the external clock.

The flip-flop circuit 57 informs to the micro computer 40 as to whether the present system clock φ is the external clock 11 or the internal clock generated by the ring oscillator 51. Thus the micro computer can execute necessary routines, when the system clock returns to the external clock 11 again.

Setting the frequency of the inner clock generated by a ring oscillator 51 or a CR oscillator to be smaller than that of the external clock 11, the consumption of electric power can be reduced, while the inner clock from the ring oscillator or from the CR oscillator is used.

EMBODIMENT 3

The third embodiment is different from the second embodiment in the point that the ring oscillator selection signal 61 is "H", so that the inner clock from the ring oscillator 51 is always used as a system clock φ of the micro computer 40, irrespective of the state of the external clock, the oscillation is normal or the oscillation is stopping.

A ring oscillator selection signal storing register 61 in FIG. 4 holds a ring oscillator selection signal of "H", which is sent from the CPU 45. The signal is sent, when the system clock φ shall be the inner clock, which is generated by the ring oscillator 51, in place of the external clock 11.

The function of the third embodiment is explained below. When the inner clock, which is generated by the ring oscillator 51, shall be used as a system clock φ in place of the external clock 11, a ring oscillator selection signal is output from the CPU 45 and is held in the ring oscillator selection signal register 61.

An input of the NOR circuit 42 is a signal of "H" from the register 61, therefore its output, namely the node A, is "L". And the node B is always "H". Therefore the P channel transistor 25 continues to turn off, and the N channel transistor 26 continues to turn on, thus the charging of the capacitor 28 does not occur. This leads to reduction of electric power consumption.

Also, an input of the OR circuit 51a of the ring oscillator 51 is a signal of "H" from the register 61, therefore the ring oscillator 51 starts to oscillate to generate the inner clock.

The signal of "H" stored in the register 61 is sent to the clock exchanging circuit 52, as a result, the clock exchanging circuit 52 selects the inner clock from the ring oscillator 51, as a system clock φ, in place of the external clock 11, and supplies it to the micro computer 40.

As explained, there are following advantages in the third embodiment: The inner clock can be used as the system clock φ in place of the external clock, irrespective of the state of the external clock, namely, the oscillation is normal or the oscillation is stopping. In general, the frequency of the inner clock is set to be smaller than that of the external clock 11. Therefore, when the inner clock is used as a system clock, the consumption of the electric power can be reduced. Additionally, the charging of the capacitor 28 does not take place, while the inner clock is used. Thus the electric power consumption can be further reduced.

EMBODIMENT 4

The oscillation stopping detector according to the fourth embodiment of the present invention has both of the functions of the first and second embodiments. Namely the function of the first embodiment that an inner reset signal is generated as a treatment after the oscillation stopping, and the function of the second embodiment that an oscillation stopping interruption signal is generated as a treatment after the oscillation stopping, are included in the detector. And one of the functions can be selected by a computer software of the micro computer.

The fourth embodiment can have a function of the third embodiment. In other words, the fourth embodiment can have a function to select the inner clock from the ring oscillator 51 as a system clock φ in place of the external clock 11, irrespective of the state of the external clock, namely, the oscillation is normal or the oscillation is stopping, and a computer software selects whether this function shall be executed or not.

The fourth embodiment has an advantage that an appropriate treatment after the oscillation stopping can be arbitrarily selected, corresponding to the application of the micro computer.

As explained, the detector of an oscillation stopping according to the present invention comprises: a one shot pulse generator, which detects the standing up edge and/or the standing down edge of the external clock to generate a one shot pulse; a charge/discharge circuit, which is charged, while the one shot pulse is not supplied, and is discharged, while the one shot pulse is supplied; and an initialization signal generating circuit, which judges that the oscillation of the external clock is stopping, when the charged voltage of the charge-discharge circuit exceeds a predetermined value, and generates an initialization signal for initializing the micro computer. And the CPU plays no roll in detecting the oscillation stopping of the external clock. Thus there is an advantage that the load of the CPU can be decreased, and detection of the oscillation stopping can be assured.

The oscillation stopping can be detected, on the basis of the time interval of the external clock, therefore the time from the occurrence of the oscillation stopping to its detection is short. Namely the oscillation stopping can be quickly detected, and a quick response to the micro computer after the detection of the oscillation stopping is possible.

The apparatus for executing a treatment after the detection of an oscillation stopping of the present invention, comprises a one shot pulse generating circuit, which generates a one shot pulse, when it detects an external clock signal, a charge/discharge circuit, which charges, while the one shot pulse is not generated, and discharges, while the one shot pulse is generated, an oscillation stopping signal generating circuit, which generates an oscillation stopping signal, when the charged voltage of the charge/discharge circuit exceeds a predetermined value, an internal clock generating circuit, which is formed as a ring oscillator or as a CR oscillator and is actuated by the signal indicating that the oscillation is stopping, for supplying an internal clock signal to the micro computer, and an interruption signal generating circuit for generating and supplying an interruption signal to the CPU in response to the oscillation stopping signal. Thus, there are following advantages in it:

The micro computer can continue its function even after the stopping of the external clock.

Setting the frequency of the inner clock generated by a ring oscillator 51 or a CR oscillator to be smaller than that of the external clock 11, the consumption of electric power can be reduced, while the inner clock from the ring oscillator or from the CR oscillator is used.

When the oscillation of the external clock 11 stops, an interruption signal generating circuit can generate an interruption signal. Thus corresponding interruption routines can be executed, according to a many kind of application programs of the micro computer.

The apparatus according to the present invention has a logic circuit to prohibit the charge-discharge function of the charge-discharge circuit, when the function is prohibited by the CPU or a stop/wait signal is outputted from the CPU so as to stop or wait the entering of the external clock. Thus it is possible to allow or prohibit the function of the charge-discharge circuit according to the application of the micro computer so as to increase the reliability of the micro computer. Additionally, it is possible to decrease the electric power consumption, by prohibiting the function of the charge-discharge circuit.

The apparatus according to the present invention has a flip-flop circuit for providing the oscillation stopping signal synchronized with the system clock to the CPU. Thus the micro computer can discriminate whether the present system clock is an external clock or an internal clock generated by a ring oscillator or by a CR oscillator. When the system clock returns from the internal clock to the external clock again, the micro computer can execute a necessary returning routine from the interruption routine at the period of oscillation stopping.

The apparatus according to the present invention has a register for storing a data, which is set by the CPU and determines whether the internal clock shall be actuated or stopped, and a clock exchanging circuit, which selects the internal clock, when the data is for the actuation of the inner clock, and selects the external clock, when the data is for the stopping of the internal clock, and supplies the system clock to the CPU according to the selection. Thus it is possible to employ the internal clock, generated by a ring oscillator or by a CR oscillator, as a system clock in place of the external clock, independently from the state of the external clock, namely the oscillation is normal or stopping. Thus the consumption of the electric power can be decreased.

What is claimed is:

1. A detector of an oscillation stopping comprising:
   a one shot pulse generator, which detects the standing up edge and/or the standing down edge of the external clock to generate a one shot pulse;
   a charge/discharge circuit, which is charged, while the one shot pulse is not supplied, and is discharged, while the one shot pulse is supplied;
   and an initialization signal generating circuit, which judges that the oscillation of the external clock is stopping, when the charged voltage of the charge/discharge circuit exceeds a predetermined value, and generates an initialization signal for initializing the micro computer.

2. A detector of an oscillation stopping according to claim 1, wherein the detector comprises a logic circuit to prohibit the function of the charge/discharge circuit, when the CPU outputs a signal for prohibiting the function of the charge/discharge circuit or when the CPU outputs a stop/wait mode signal for setting the micro computer to be the stop/wait mode.

3. An apparatus for executing a treatment after the detection of an oscillation stopping comprising:
   a one shot pulse generator, which detects the standing up edge and/or the standing down edge of the external clock to generate a one shot pulse;
   a charge/discharge circuit, which is charged, while the one shot pulse is not supplied, and is discharged, while the one shot pulse is supplied;
   an oscillation stopping signal generating circuit, which judges that the oscillation of the external clock is stopping, when the charged voltage of the charge/discharge circuit exceeds a predetermined value, and generates an oscillation stopping signal;
   an inner clock generating circuit, which is actuated by the oscillation stopping signal sent from the oscillation stopping signal generating circuit, and generates an inner clock to send to the micro computer as a system clock;
   and an oscillation stopping detecting circuit, which generates an interruption signal to send to the micro computer, corresponding to the oscillation stopping signal from the oscillation stopping signal generating circuit.

4. An apparatus for executing a treatment after the detection of an oscillation stopping according to claim 3, wherein the apparatus comprises a logic circuit to prohibit the function of the charge-discharge circuit, when the CPU outputs a signal for prohibiting the function of the charge/ discharge circuit or when the CPU outputs a stop/wait mode signal for setting the micro computer to be the stop/wait mode.

5. An apparatus for executing a treatment after the detection of an oscillation stopping according to claim 3, wherein the apparatus comprises a flip-flop circuit for supplying a clock monitor signal to the micro computer, which is the oscillation stopping signal supplied from the oscillation stopping signal generating circuit and is synchronized with the system clock.

6. An apparatus for executing a treatment after the detection of an oscillation stopping according to claim 3, wherein the detector comprises a register for storing a command being set by the CPU for controlling the actuation and the stopping of the inner clock oscillating circuit, and a clock exchanging circuit for selecting a clock signal, which selects the inner clock generated by the inner clock oscillation circuit and supplies the inner clock to the micro computer as a system clock, when the command in the register is the actuation of the inner clock oscillation circuit, the clock exchanging circuit selects the external clock to supply to the micro computer as a system clock, when the command in the register is the stopping of the inner clock oscillation circuit.

* * * * *